United States Patent [19]

Stohler et al.

[11] 4,388,032
[45] Jun. 14, 1983

[54] LIFTING AND STOWAGE SYSTEM

[75] Inventors: Robert A. Stohler, Paulsbo; Benjamin D. Murray, Bremerton, both of Wash.

[73] Assignee: The United States of America as represented by the Secretary of the Navy, Washington, D.C.

[21] Appl. No.: 202,213

[22] Filed: Oct. 30, 1980

[51] Int. Cl.³ .................. B60P 7/10; B63B 25/22; B65G 57/30

[52] U.S. Cl. .................. 414/95; 294/67 R; 410/55; 410/78; 410/85; 410/99; 410/100; 414/140; 414/673

[58] Field of Search .............. 414/28, 29, 92, 95, 414/97, 137, 140, 673; 410/55, 68, 77, 78, 79, 97, 98, 99, 100; 294/67 R, 67 DA, 81 SF; 187/67

[56] References Cited

U.S. PATENT DOCUMENTS

| | | | |
|---|---|---|---|
| 787,258 | 4/1905 | Austin | 187/67 |
| 2,984,367 | 5/1961 | McIntyre | 414/140 |
| 3,317,058 | 5/1967 | Kummerman | 414/140 X |
| 3,447,697 | 6/1969 | Morey et al. | 414/29 |
| 3,502,231 | 3/1970 | Raynor et al. | 414/95 X |
| 3,630,402 | 12/1971 | Young | 294/67 DA |
| 3,757,897 | 9/1973 | Moulson et al. | 294/67 DA X |
| 3,764,032 | 10/1973 | Ward | 294/67 DA X |
| 3,776,169 | 12/1973 | Strecker | 410/77 |

FOREIGN PATENT DOCUMENTS 2041885 9/1980 United Kingdom .............. 410/68

Primary Examiner—Leslie J. Paperner
Attorney, Agent, or Firm—R. S. Sciascia; Charles D. B. Curry

[57] ABSTRACT

A lifting and stowage system for lifting and stowing containers within a limited magazine area. The system provides a sway bracing feature during lifting which also functions as a stowage member when completely assembled. The system also includes a pair of guide rails attached vertically to the bulkhead and a carriage that travels up and down the guide rails. A strongback is attached to the carriage and is located over the container that is positioned by a forklift. The system employs a lifting mechanism consisting of a power source, a pulley and cable system, a snatch block which attaches to the carriage, a stowage system which restrains the stack of containers in all directions and deceleration buffers. In operation, the strongback is attached to the container and the snatch block is attached to the carriage. The container is lifted to allow vertical clearance for the next container. The lower container is positioned by a forklift and the upper container is lowered onto it. The tie down system is then installed and the snatch block disconnected and returned to its stow position. The reverse is followed for unstacking.

2 Claims, 6 Drawing Figures

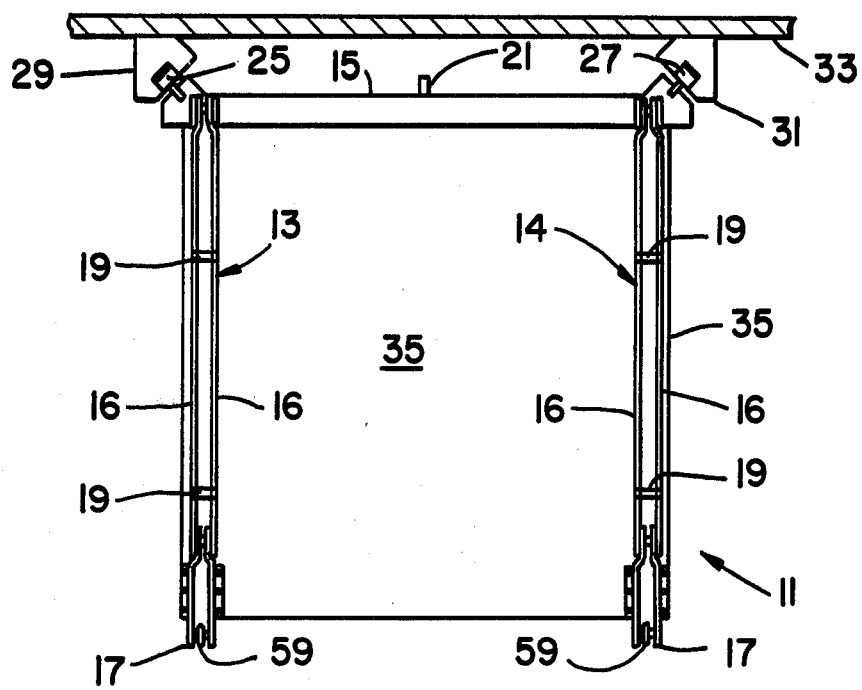
FIG_1
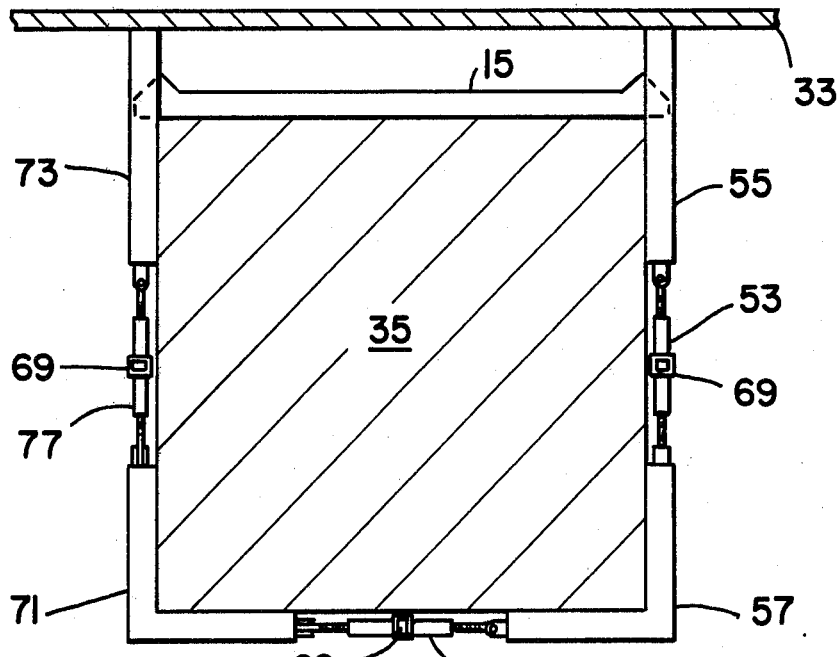
FIG_6

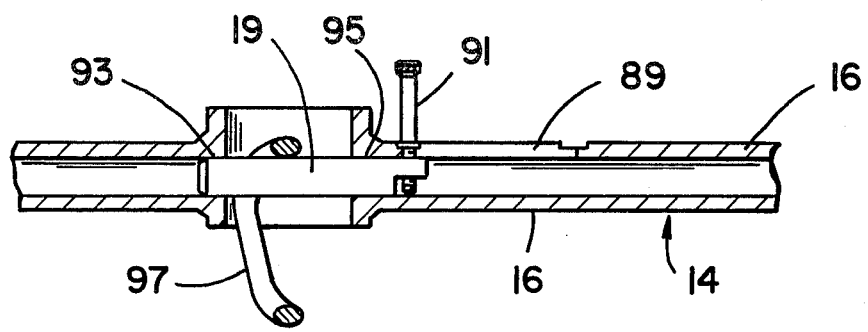
FIG_2
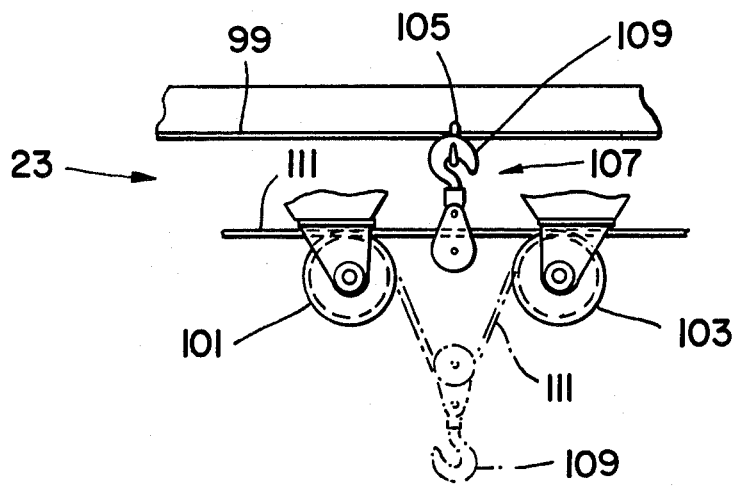
FIG_4
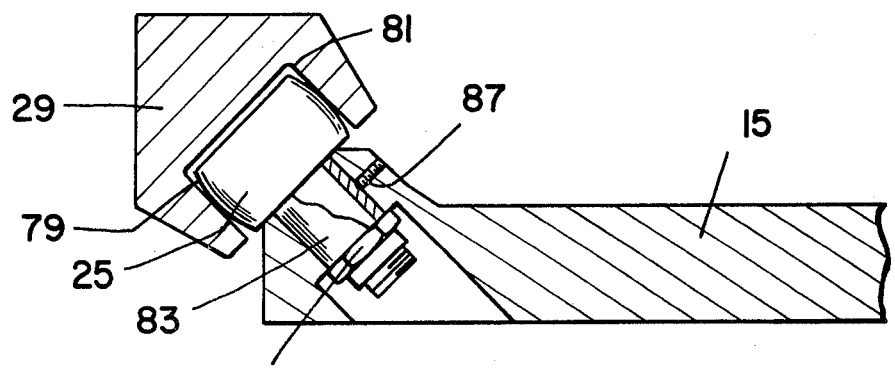
FIG_5

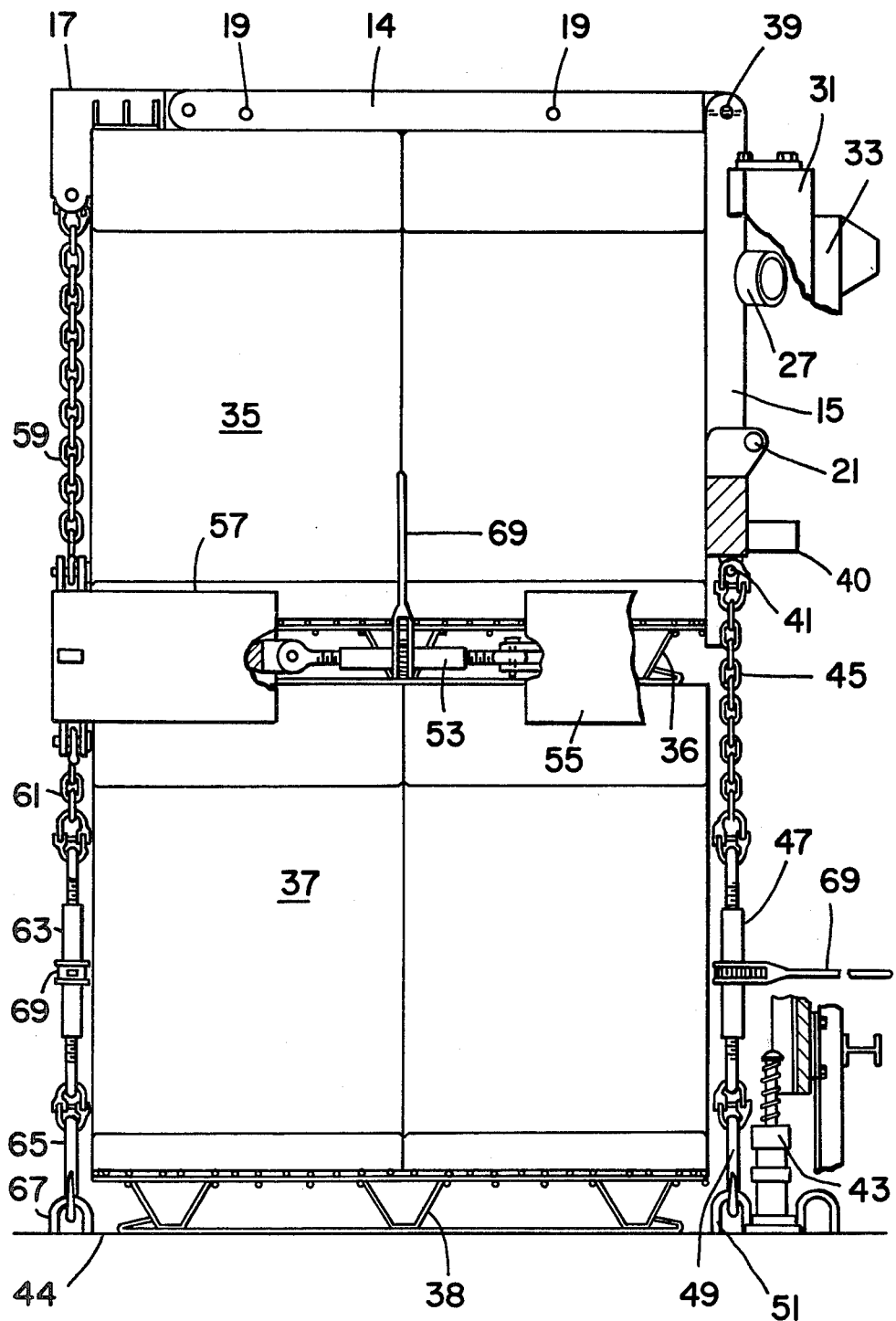
FIG_3

LIFTING AND STOWAGE SYSTEM

BACKGROUND OF THE INVENTION

1. Field of the Invention

The present invention relates to a lifting and stowage system and more particularly to a lifting and stowage system that is particularly useful in the magazine of ships.

2. Description of Prior Art

Prior ship magazine lifting and stowage systems have not made use of forklifts, have used complex overhead hoist systems and have not provided for sway bracing without complex and unwieldy mechanism installation.

The present invention overcomes these difficulties by providing an integral lifting and stowage system that employs forklifts, sway bracing and a highly effective and simple tie down and loading system.

SUMMARY OF THE INVENTION

Briefly the present invention comprises a lifting and stowage system for lifting and stowing containers within a limited magazine area. The system provides a sway bracing feature during lifting which also functions as a stowage member when completely assembled. The system also includes a pair of guide rails attached vertically to the bulkhead and a carriage that travels up and down the guide rails. A strongback is attached to the carriage and is located over the container that is positioned by a forklift. The system employs a lifting mechanism consisting of a power source, a pulley and cable system, a snatch block which attaches to the carriage, a stowage system which restrains the stack of containers in all directions and deceleration buffers. In operation, the strongback is attached to the container and the snatch block is attached to the carriage. The container is lifted to allow vertical clearance for the next container. The lower container is positioned by a forklift and the upper container is lowered onto it. The tie down system is then installed and the snatch block disconnected and returned to its stow position. The reverse is followed for unstacking.

STATEMENT OF THE OBJECTS OF THE INVENTION

An object of the present invention is to provide an integral and effective lifting and stowage system.

Another object of the present invention is to provide swaybrace during lifting that also functions as part of the stowage system.

Still another object of the present invention is to provide a lifting and stowage system that is rapid to operate, reliable and safe.

Other objects, advantages and novel features will be apparent from the following detailed description when read in conjunction with the appended claims and attached drawings.

BRIEF DESCRIPTION OF THE DRAWINGS

FIG. 1 is a schematic top elevation of the basic elements of the lifting and stowage system of the present invention.

FIG. 2 is a detailed drawing of the lifting pin section of the strongback of FIGS. 1 and 3.

FIG. 3 is a front elevation, partly in section, of the details of the lifting and stowage system of the present invention.

FIG. 4 is a side elevation of the overhead lifting mechanism used to lift the carriage and containers of the present invention.

FIG. 5 is a detailed drawing of the guide rail, roller and carriage of the present invention.

FIG. 6 is a schematic top elevation of the corner bans and load binders of the present invention.

DESCRIPTION OF THE PREFERRED EMBODIMENT

In FIG. 1 is shown a top elevation of the basic elements of the lifting and stowage system 11 of the present invention. The system includes strongbacks 13 and 14 that are spaced apart and each has one end rigidly attached to carriage 15. Each strongback comprises a pair of spaced apart members 16, a corner tie member 17 and a pair of lifting pins 19 the details of which are shown in FIG. 2. As shown in FIGS. 1 and 3, the carriage 15 has a snatch block pin 21 that is used for lifting the carriage by lifting mechanism 23 shown in FIG. 4. The carriage 15 has rollers 25 and 27 mounted on its respective ends with their axis of rotation at a 45° angle to the longitudinal axis of the carriage and at a 90° angle with respect to each other. Rollers 25 and 27 are respectively mounted in guide rails 29 and 31. Guide rails 29 and 31 are spaced apart and vertically mounted on bulkhead 33. The details of the roller and rail guide are shown in FIGS. 1 and 5.

In FIG. 3 is shown the front elevation, partly in section, of the details of lifting and stowage system 11 that retains containers 35 and 37 in the locked or stowed position. Containers 35 and 37 are respectively mounted on pallets 36 and 38. The strongback is pivoted by pin 39 to the top of carriage 15 and the lower end of carriage 15 includes buffer striker 40 and pin 41. Buffer striker 40 contacts buffer 43 which is mounted on deck 44 and functions as a shock absorber for the carriage. Pin 41 functions to support the end link of chain 45. The other end of chain 45 is connected to one end of load binder 47, the other end of which is connected to hook 49 which is connected to eye 51 which is mounted on the deck 44. Load binder 53 has one end attached to one end of member 55 that has the other end attached to bulkhead 33. The other end of load binder 53 is connected to one end of corner ban 57. A top elevation view of loadbinder 53, member 55 and corner ban 57 is shown in FIG. 6. The downwardly extending end of corner tie 17 is connected to the upper end of chain 59 and the lower end of chain 59 is connected to corner ban 57. The upper end of chain 61 is connected to corner ban 57 and the lower end is connected to the upper end of load binder 63. The lower end of load binder 63 is connected to hook 65 which is connected to eye 67 which is mounted on deck 44. Each of the load binders are provided with hand operated ratchets 69 for operation.

In FIG. 6 is schematically shown corner ban 71, member 73 (that is connected to bulkhead 33) and load binders 75 and 77. For clarity the carriage, guide rails and other elements of the lifting and stowage device 11 are not shown.

Referring to FIG. 5, the outer surface 79 of roller 25 has a slight radius of curvature that interacts with straight slots 81 of guide rail 29. This functions to minimize binding, especially when the spin axis of roller 25 is slightly offset, from the aligned position shown, during operation. Roller 25 is rotationally mounted on shaft 83 which is held in place by bolt 85 and set screw 87.

Referring to FIG. 2, one of parallel members 16 of strongback 14 has a slot 89 for receiving locking pin 91. Members 16 also include openings 93 and 95 to support lifting pin 19. Locking pin 91 threadably engages one end of lifting pin 19 and is used to insert or withdraw the lifting pin. When lifting pin 19 is fully inserted into opening 93 it captures container hook 97 to lift the container as described below.

Referring to FIG. 4, the upper deck 99 supports pulleys 101 and 103 and an eye 105 to store snatch block 107 when it is not being used as shown. Snatch block 107 includes hook 109 and a pulley, not shown. The pulley engages cable 111 that is connected to a power source that takes up the cable, in the position shown, or releases the cable so that the snatch block 107 and cable 111 are released downward as shown by the dotted lines. The system employs this single cable that services a plurality of lifting and stowage elements in the magazine.

OPERATION

The sequence of operation is as follows:

(1) When carriage 15 is in the fully lowered position and resting on deck 44, container 35 and its pallet 36 are placed on the deck directly under the system.

(2) The four container hooks 97 (FIG. 2) are connected to the four strongback lifting pins 19.

(3) By means of hook 107 (FIG. 4) and snatch block pin 21 (FIG. 3) the carriage 15, strongbacks 13 and 14 and container 35 (including pallet 36) are lifted to their upper most position. It should be noted that during lifting, strongbacks 13 and 14 also function as sway braces to prevent swaying of the containers.

(4) Container 37 and its pallet 38 are positioned on the deck in the properly aligned position directly under container 35.

(5) Container 35 and pallet 36 are lowered onto container 37 and snatch block 107 is returned to the position shown in FIG. 4.

(6) The various corner bans, chains, hooks and load binders are attached and tightened as shown in FIG. 3.

(7) The reverse operation is performed to remove the containers.

What is claimed is:
1. A lifting and stowage system comprising:
(a) a carriage, said carriage including a snatch block pin and a buffer striker;
(b) first and second strongbacks, one end of each of said first and second strongbacks rigidly connected to said carriage in spaced apart and parallel relationships, said first strongback including first and second lifting pins, said second strongback including third and fourth lifting pins;
(c) first and second guide rails, said first and second guide rails mounted in a vertical spaced apart, parallel relationship;
(d) first and second rollers, said first and second rollers rotatably mounted on said carriage and respectively in engagement with said first and second guide rails;
(e) lifting means for raising and lowering said carriage by engaging said snatch block, said lifting means including a cable fixed at one end, drive means connected to the other end of said cable, means for supporting said cable in the horizontal position above said carriage, a snatch block including a pulley and a hook, said pulley being supported by said cable, whereby said snatch block is lowered when said drive means releases said cable and is raised when said drive means tightens said cable;
(f) a buffer mounted on a deck, said buffer striker positioned to engage said buffer when said carriage is lowered to its lower most position;
(g) a first and a second container, said first container connected to said first, second, third and fourth lifting pins and raised to an elevated position by said carriage, said second container being positioned under said first container and said first container being loaded onto said second container; and
(h) tie down means for tieing down said first and second containers, said tie down means including a plurality of chain and load binders for connecting said first and second strongbacks and said carriage to said deck to retain said first and second containers in a fixed position.

2. The system of claim 1 wherein:
(a) each of said first and second rollers has a spin axis that is at a 45° angle to the longitudinal axis of said carriage and at a 90° angle with respect to each other; and
(b) said first and second guide rails have longitudinal slots at 45° angles and in alignment with the spin axis of said rollers.

* * * * *